US010945222B2

(12) United States Patent
Lu et al.

(10) Patent No.: US 10,945,222 B2
(45) Date of Patent: Mar. 9, 2021

(54) POWER CONTROL METHOD AND TERMINAL DEVICE

(71) Applicant: Huawei Technologies Co., Ltd., Shenzhen (CN)

(72) Inventors: Zhenwei Lu, Beijing (CN); Deping Liu, Beijing (CN); Lei Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/739,699

(22) Filed: Jan. 10, 2020

(65) Prior Publication Data

US 2020/0154373 A1 May 14, 2020

Related U.S. Application Data

(63) Continuation of application No. PCT/CN2018/090572, filed on Jun. 11, 2018.

(30) Foreign Application Priority Data

Jul. 12, 2017 (CN) .......................... 201710567573.6

(51) Int. Cl.
*H04W 52/38* (2009.01)
*H04W 52/24* (2009.01)
(Continued)

(52) U.S. Cl.
CPC ....... *H04W 52/383* (2013.01); *H04W 52/226* (2013.01); *H04W 52/242* (2013.01); *H04W 52/245* (2013.01); *H04W 52/265* (2013.01)

(58) Field of Classification Search
CPC .. H04L 5/0048; H04L 5/0091; H04W 52/225; H04W 52/226; H04W 52/242;
(Continued)

(56) References Cited

U.S. PATENT DOCUMENTS 10,624,076 B2 * 4/2020 Kim ................... H04W 72/0406
2014/0274196 A1 * 9/2014 Dai ..................... H04W 52/242
455/522
(Continued)

FOREIGN PATENT DOCUMENTS

CN 105144796 A 12/2015
EP 3070980 B1 1/2019
(Continued)

OTHER PUBLICATIONS

Intel Corporation, "Sidelink UE-to-NW Relaying for Wearable and IoT Use Cases", 3GPP TSG RAN WG1 Meeting #89; R1-1707332, May 15-19, 2017, XP051262992, 8 pages.
(Continued)

*Primary Examiner* — Tan H Trinh
(74) *Attorney, Agent, or Firm* — Slater Matsil, LLP

(57) ABSTRACT

A power control method and a terminal device are disclosed. The method includes: sending, by a first terminal device, first data and first sidelink control information corresponding to the first data to at least one second terminal device; receiving, by the first terminal device, at least one piece of power adjustment information from the at least one second terminal device, where the at least one piece of power adjustment information is determined by the at least one second terminal device based on at least one of the first data and the first sidelink control information; determining, by the first terminal device, a transmit power for second data based on the at least one piece of power adjustment information; and sending, by the first terminal device, the second data to the at least one second terminal device at the transmit power.

20 Claims, 4 Drawing Sheets

(51) Int. Cl.
*H04W 52/22* (2009.01)
*H04W 52/26* (2009.01)

(58) Field of Classification Search
CPC ............ H04W 52/245; H04W 52/265; H04W 52/367; H04W 52/383; H04W 52/54
USPC ................. 455/69, 522, 41.1, 42.2
See application file for complete search history.

(56) References Cited

U.S. PATENT DOCUMENTS

| | | | | |
|---|---|---|---|---|
| 2017/0188391 | A1* | 6/2017 | Rajagopal | H04W 74/0816 |
| 2018/0176892 | A1* | 6/2018 | Kim | H04W 72/042 |
| 2018/0219701 | A1* | 8/2018 | Seo | H04J 11/0079 |
| 2018/0310287 | A1* | 10/2018 | Zhang | H04W 72/042 |
| 2018/0359707 | A1* | 12/2018 | Chae | H04W 52/383 |
| 2019/0045507 | A1* | 2/2019 | Sorrentino | H04W 4/40 |
| 2019/0174429 | A1* | 6/2019 | Wang | H04W 52/54 |
| 2019/0191404 | A1* | 6/2019 | Tang | H04W 48/10 |
| 2020/0059918 | A1* | 2/2020 | Lu | H04W 72/0406 |
| 2020/0099478 | A1* | 3/2020 | Li | H04W 72/042 |
| 2020/0137782 | A1* | 4/2020 | Su | H04W 72/042 |
| 2020/0178218 | A1* | 6/2020 | Lu | H04W 4/40 |

FOREIGN PATENT DOCUMENTS

| | | |
|---|---|---|
| WO | 2016073988 A1 | 5/2016 |
| WO | 2017052690 A1 | 3/2017 |

OTHER PUBLICATIONS

Intel Corporation, "Sidelink Feedback Information and Signalling for Wearable and IoT Use Cases", 3GPP TSG RAN WG1 Meeting #89; R1-1707335, May 15-19, 2017, XP051262995, 4 pages.
Huawei, "Power control for V2v," 3GPP TSG RAN WG1 Meeting #83,R1-156429, Anaheim, USA, Nov. 15-22, 2015, 4 pages.
Samsung, "Power control enhancements in V2V communication," 3GPP TSG RAN WG1 #84, R1-160578, St. Julian's, Malta, Feb. 15-19, 2016, 2 pages.

* cited by examiner

POWER CONTROL METHOD AND TERMINAL DEVICE

CROSS-REFERENCE TO RELATED APPLICATIONS

This application is a continuation of International Application No. PCT/CN2018/090572, filed on Jun. 11, 2018, which claims priority to Chinese Patent Application No. 201710567573.6, filed on Jul. 12, 2017. The disclosures of the aforementioned applications are hereby incorporated by reference in their entireties.

TECHNICAL FIELD

Embodiments of this application relate to a communications system, and in particular, to a power control method and a terminal device.

BACKGROUND

Device-to-device (D2D) communication, machine-to-machine (M2M) communication, vehicle-to-vehicle (V2V) communication, vehicle-to-pedestrian (V2P) communication, or vehicle-to-infrastructure/network (V2I/N) communication is a technology for direct communication between terminal devices, namely, direct communication. V2V, V2P, and V2I/N are collectively referred to as V2X, to be specific, a vehicle communicates with anything. In V2X communication, a transmit end device may directly send data to a receive end device, and a power at which the transmit end device sends the data is determined based on factors such as a maximum transmit power of the transmit end device, a quantity of resource blocks occupied by the transmit end device to send the data, and a path loss estimated by the transmit end device. However, the method for determining the transmit power at which the transmit end device sends the data is relatively fixed, and the transmit power of the transmit end device cannot be flexibly and accurately controlled. Therefore, a more flexible and accurate power control method is urgently needed in the industry.

SUMMARY

Embodiments of this application provide a power control method and a terminal device, to implement more flexible and accurate power control in V2X communication.

According to a first aspect, a power control method is provided. The method includes: sending, by a first terminal device, first data and first sidelink control information corresponding to the first data to at least one second terminal device; receiving, by the first terminal device, at least one piece of power adjustment information from the at least one second terminal device, where the at least one piece of power adjustment information is determined by the at least one second terminal device based on at least one of the first data and the first sidelink control information; determining, by the first terminal device, a transmit power for second data based on the at least one piece of power adjustment information; and sending, by the first terminal device, the second data to the at least one second terminal device at the transmit power.

The at least one second terminal device determines the power adjustment information based on at least one of the data and the control information that are received from the first terminal device, and sends the power adjustment information to the first terminal device; and the first terminal device determines, based on the power adjustment information sent by the at least one second terminal device, the transmit power for the second data that is to be sent, to be specific, the first terminal device can adjust, based on a feedback of a receive end, a power for sending data, thereby improving flexibility and accuracy of power control.

In a possible design, the determining, by the first terminal device, a transmit power for second data based on the at least one piece of power adjustment information includes: determining, by the first terminal device, a first power adjustment value based on at least one of a maximum value, a minimum value, an average value, a median value, a mode value, a quartile value, a geometric average value, and a harmonic average value of the at least one piece of power adjustment information; and determining, by the first terminal device, the transmit power for the second data based on the first power adjustment value.

In a possible design, that the at least one piece of power adjustment information is determined by the at least one second terminal device based on at least one of the first data and the first sidelink control information includes: the at least one piece of power adjustment information is determined by the at least one second terminal device based on measurement on at least one of the first data and the first sidelink control information, where the measurement includes at least one of reference signal received power (RSRP) measurement, reference signal received quality (RSRQ) measurement, and received signal strength indicator (RSSI) measurement.

The at least one second terminal device determines the power adjustment information by measuring the first data and the first sidelink control information, to be specific, obtains the power adjustment information by measuring a signal that is actually received by the at least one second terminal device, so that power adjustment accuracy can be improved.

In a possible design, that the at least one piece of power adjustment information is determined by the at least one second terminal device based on at least one of the first data and the first sidelink control information includes: the at least one piece of power adjustment information is determined based on power indication information sent by the first terminal device, where the power indication information is included in the first data or included in the first sidelink control information, and the power indication information is used to indicate a transmit power for at least one of the first data and the first sidelink control information.

That the at least one second terminal device determines the power adjustment information based on the power indication information sent by the first terminal device can simplify a method for determining the power adjustment information by the second terminal device.

In a possible design, the power adjustment information is used to instruct to perform at least one operation of increasing, decreasing, or maintaining the power.

In a possible design, the first terminal device receives a path loss-related parameter from the at least one second terminal device, where the path loss-related parameter is used by the first terminal device to determine the transmit power for the second data, and the path loss-related parameter may be a transmit power of the at least one second terminal device, or a value that is of a path loss between the first terminal device and the at least one second terminal device and that is estimated by the at least one second terminal device.

According to a second aspect, a first terminal device is provided. The first terminal device includes: a sending unit, configured to send first data and first sidelink control information corresponding to the first data to at least one second terminal device; a receiving unit, configured to receive at least one piece of power adjustment information from the at least one second terminal device, where the at least one piece of power adjustment information is determined by the at least one second terminal device based on at least one of the first data and the first sidelink control information; and a determining unit, configured to determine a transmit power for second data based on the at least one piece of power adjustment information, where the sending unit sends the second data to the at least one second terminal device at the transmit power.

The at least one second terminal device determines the power adjustment information based on at least one of the data and the control information that are received from the first terminal device, and sends the power adjustment information to the first terminal device; and the first terminal device determines, based on the power adjustment information sent by the at least one second terminal device, the transmit power for the second data that is to be sent, to be specific, the first terminal device can adjust, based on a feedback of a receive end, a power for sending data, thereby improving flexibility and accuracy of power control.

In a possible design, that the determining unit determines the transmit power for the second data based on the at least one piece of power adjustment information includes: determining, by the determining unit, a first power adjustment value based on at least one of a maximum value, a minimum value, an average value, a median value, a mode value, a quartile value, a geometric average value, and a harmonic average value of the at least one piece of power adjustment information; and determining, by the determining unit, the transmit power for the second data based on the first power adjustment value.

In a possible design, that the at least one piece of power adjustment information is determined by the at least one second terminal device based on at least one of the first data and the first sidelink control information includes: the at least one piece of power adjustment information is determined by the at least one second terminal device based on measurement on at least one of the first data and the first sidelink control information, where the measurement includes at least one of reference signal received power (RSRP) measurement, reference signal received quality (RSRQ) measurement, and received signal strength indicator (RSSI) measurement.

The at least one second terminal device determines the power adjustment information by measuring the first data and the first sidelink control information, to be specific, obtains the power adjustment information by measuring a signal that is actually received by the at least one second terminal device, so that power adjustment accuracy can be improved.

In a possible design, that the at least one piece of power adjustment information is determined by the at least one second terminal device based on at least one of the first data and the first sidelink control information includes: the at least one piece of power adjustment information is determined based on power indication information sent by the sending unit, where the power indication information is included in the first data or included in the first sidelink control information, and the power indication information is used to indicate a transmit power for at least one of the first data and the first sidelink control information.

That the at least one second terminal device determines the power adjustment information based on the power indication information sent by the first terminal device can simplify a method for determining the power adjustment information by the second terminal device.

In a possible design, the power adjustment information is used to instruct to perform at least one operation of increasing, decreasing, or maintaining the power.

In a possible design, the first terminal device receives a path loss-related parameter from the at least one second terminal device, where the path loss-related parameter is used by the first terminal device to determine the transmit power for the second data, and the path loss-related parameter may be a transmit power of the at least one second terminal device, or a value that is of a path loss between the first terminal device and the at least one second terminal device and that is estimated by the at least one second terminal device.

In a possible design, the sending unit may be a transmitter or a transceiver, the processing unit may be a processor, and the receiving unit may be a receiver or a transceiver.

According to a third aspect, a power control method is provided. The method includes: receiving, by a second terminal device, first data and first sidelink control information corresponding to the first data from a first terminal device; determining, by the second terminal device, power adjustment information based on at least one of the first data and the first sidelink control information; and sending, by the second terminal device, the power adjustment information to the first terminal device, where the power adjustment information is used by the first terminal device to determine a transmit power for second data.

The at least one second terminal device determines the power adjustment information based on at least one of the data and the control information that are received from the first terminal device, and sends the power adjustment information to the first terminal device; and the first terminal device determines, based on the power adjustment information sent by the at least one second terminal device, the transmit power for the second data that is to be sent, to be specific, the first terminal device can adjust, based on a feedback of a receive end, a power for sending data, thereby improving flexibility and accuracy of power control.

In a possible design, the determining, by the second terminal device, power adjustment information based on at least one of the first data and the first sidelink control information includes: determining, by the second terminal device, the power adjustment information based on measurement on at least one of the first data and the first sidelink control information, where the measurement includes at least one of reference signal received power (RSRP) measurement, reference signal received quality (RSRQ) measurement, and received signal strength indicator (RSSI) measurement.

The at least one second terminal device determines the power adjustment information by measuring the first data and the first sidelink control information, to be specific, obtains the power adjustment information by measuring a signal that is actually received by the at least one second terminal device, so that power adjustment accuracy can be improved.

In a possible design, the determining, by the second terminal device, power adjustment information based on at least one of the first data and the first sidelink control information includes: determining, by the second terminal device, the power adjustment information based on power indication information received from the first terminal device, where the power indication information is included in the first data or included in the first sidelink control information, and the power indication information is used to indicate a transmit power for at least one of the first data and the first sidelink control information.

That the at least one second terminal device determines the power adjustment information based on the power indication information sent by the first terminal device can simplify a method for determining the power adjustment information by the second terminal device.

In a possible design, the power adjustment information is used to instruct to perform at least one operation of increasing, decreasing, or maintaining the power.

In a possible design, the at least one second terminal device sends a path loss-related parameter to the first terminal device, where the path loss-related parameter is used by the first terminal device to determine the transmit power for the second data, and the path loss-related parameter may be a transmit power of the at least one second terminal device, or a value that is of a path loss between the first terminal device and the at least one second terminal device and that is estimated by the at least one second terminal device.

According to a fourth aspect, a second terminal device is provided. The second terminal device includes: a receiving unit, configured to receive first data and first sidelink control information corresponding to the first data from a first terminal device; a determining unit, configured to determine power adjustment information based on at least one of the first data and the first sidelink control information; and a sending unit, configured to send the power adjustment information to the first terminal device, where the power adjustment information is used by the first terminal device to determine a transmit power for second data.

The at least one second terminal device determines the power adjustment information based on at least one of the data and the control information that are received from the first terminal device, and sends the power adjustment information to the first terminal device; and the first terminal device determines, based on the power adjustment information sent by the at least one second terminal device, the transmit power for the second data that is to be sent, to be specific, the first terminal device can adjust, based on a feedback of a receive end, a power for sending data, thereby improving flexibility and accuracy of power control.

In a possible design, that the determining unit determines the power adjustment information based on at least one of the first data and the first sidelink control information includes: determining, by the determining unit, the power adjustment information based on measurement on at least one of the first data and the first sidelink control information, where the measurement includes at least one of reference signal received power (RSRP) measurement, reference signal received quality (RSRQ) measurement, and received signal strength indicator (RSSI) measurement.

The at least one second terminal device determines the power adjustment information by measuring the first data and the first sidelink control information, to be specific, obtains the power adjustment information by measuring a signal that is actually received by the at least one second terminal device, so that power adjustment accuracy can be improved.

In a possible design, that the determining unit determines the power adjustment information based on at least one of the first data and the first sidelink control information includes: determining, by the determining unit, the power adjustment information based on power indication information received from the first terminal device, where the power indication information is included in the first data or included in the first sidelink control information, and the power indication information is used to indicate a transmit power for at least one of the first data and the first sidelink control information.

That the at least one second terminal device determines the power adjustment information based on the power indication information sent by the first terminal device can simplify a method for determining the power adjustment information by the second terminal device.

In a possible design, the power adjustment information is used to instruct to perform at least one operation of increasing, decreasing, or maintaining the power.

In a possible design, the at least one second terminal device sends a path loss-related parameter to the first terminal device, where the path loss-related parameter is used by the first terminal device to determine the transmit power for the second data, and the path loss-related parameter may be a transmit power of the at least one second terminal device, or a value that is of a path loss between the first terminal device and the at least one second terminal device and that is estimated by the at least one second terminal device.

In a possible design, the sending unit may be a transmitter or a transceiver, the processing unit may be a processor, and the receiving unit may be a receiver or a transceiver.

According to a fifth aspect, an embodiment of this application provides a chip, configured to execute a program designed for the foregoing aspects.

According to a sixth aspect, an embodiment of this application provides a computer storage medium, configured to store a computer software instruction used by the foregoing terminal device. The computer storage medium includes a program designed to perform the foregoing aspects.

DETAILED DESCRIPTION OF ILLUSTRATIVE EMBODIMENTS

Figure 1:
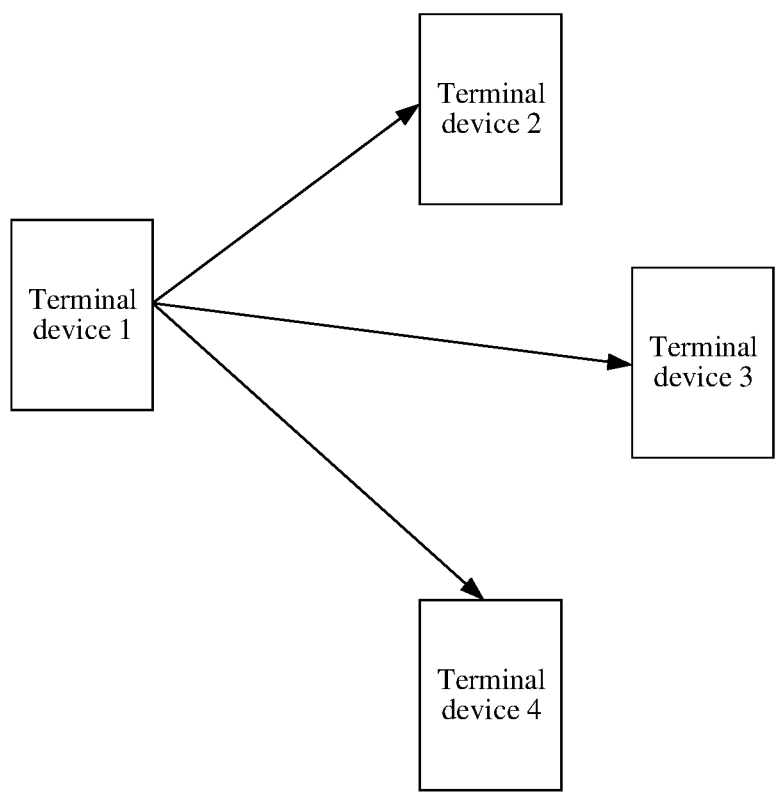
FIG. 1 is a schematic diagram of unicast or multicast communication in V2X communication according to an embodiment of this application.

FIG. 1 is a schematic diagram of unicast or multicast communication in V2X communication. For multicast communication, a terminal 1 sends data of the terminal 1 to some terminal devices around the terminal 1 instead of all terminal devices around the terminal 1. For example, the terminal device 1 sends multicast data to a terminal device 2, a terminal device 3, and a terminal device 4, and the multicast data may include, for example, speed information, location information, and direction information of the terminal device 1. The terminal device 1 may notify the other terminal devices 2 to 4 around the terminal device 1 of the foregoing information of the terminal device 1 in a direct communication manner, to assist the other terminal devices 2 to 4 in making a driving decision, for example, adjusting a speed, a location, and a moving direction, to improve reliability and stability of the terminal in a driving process. For unicast communication, the terminal device 1 only needs to send data to one terminal around the terminal 1, for example, the terminal device 2, but does not send the data to the terminal device 3 or the terminal device 4. A time-frequency resource used by the terminal device 1 to send unicast data to the terminal device 2 or a time-frequency resource used by the terminal device 1 to send the multicast data to the terminal devices 2 to 4 may be allocated by an access network device to the terminal device 1, or may be autonomously selected by the terminal device 1.

The access network device in this application is an apparatus that is deployed in a radio access network and that is configured to provide a wireless communication function to a terminal device. The access network device may include base stations (BSs) in various forms, for example, a macro base station, a micro base station, a relay station, or an access point. In systems using different radio access technologies, names of devices having a function of the access network device may be different. For example, the device is an access network device in a 5th generation 5G network; the device is referred to as an evolved NodeB (eNB or eNodeB) in an LTE network; the device is referred to as a NodeB or the like in a 3rd generation 3G network; the device is a road side unit (RSU) in V2V communication. For ease of description, in this application, the apparatuses providing a wireless communication function to a terminal device are collectively referred to as an access network device.

The terminal device in this application may include various handheld devices having a wireless communication function, for example, a vehicle-mounted device, a wearable device, a computing device, another processing device connected to a wireless modem, a mobile station (MS), a terminal, or user equipment. For ease of description, in this application, the devices mentioned above are collectively referred to as a terminal device.

The embodiments of this application are described below in more detail with reference to specific examples.

Figure 2:
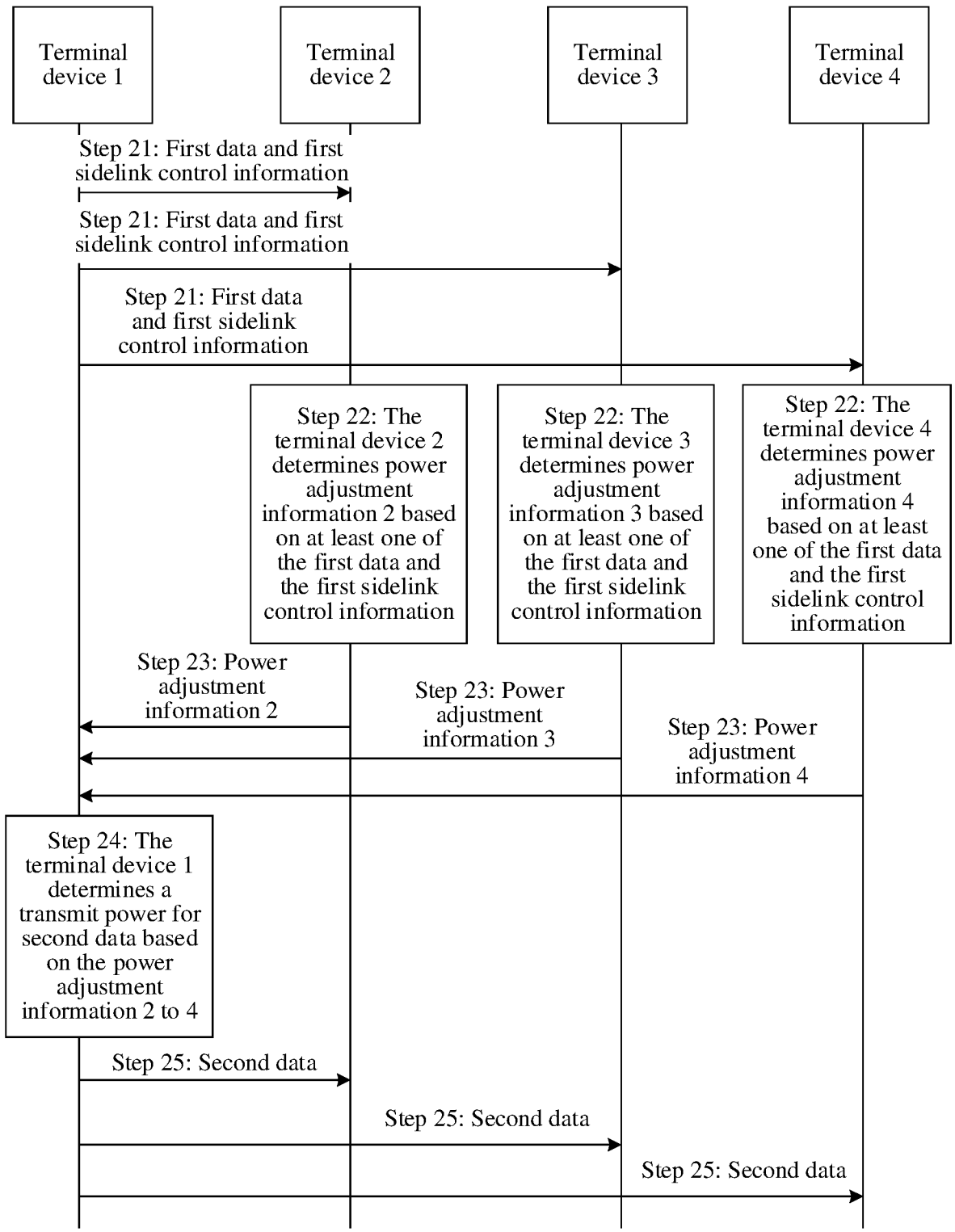
FIG. 2 is a flowchart of a power control method according to an embodiment of this application.

FIG. 2 shows a power adjustment method and a terminal device according to an embodiment of this application. Specific steps are as follows.

Figure 3:
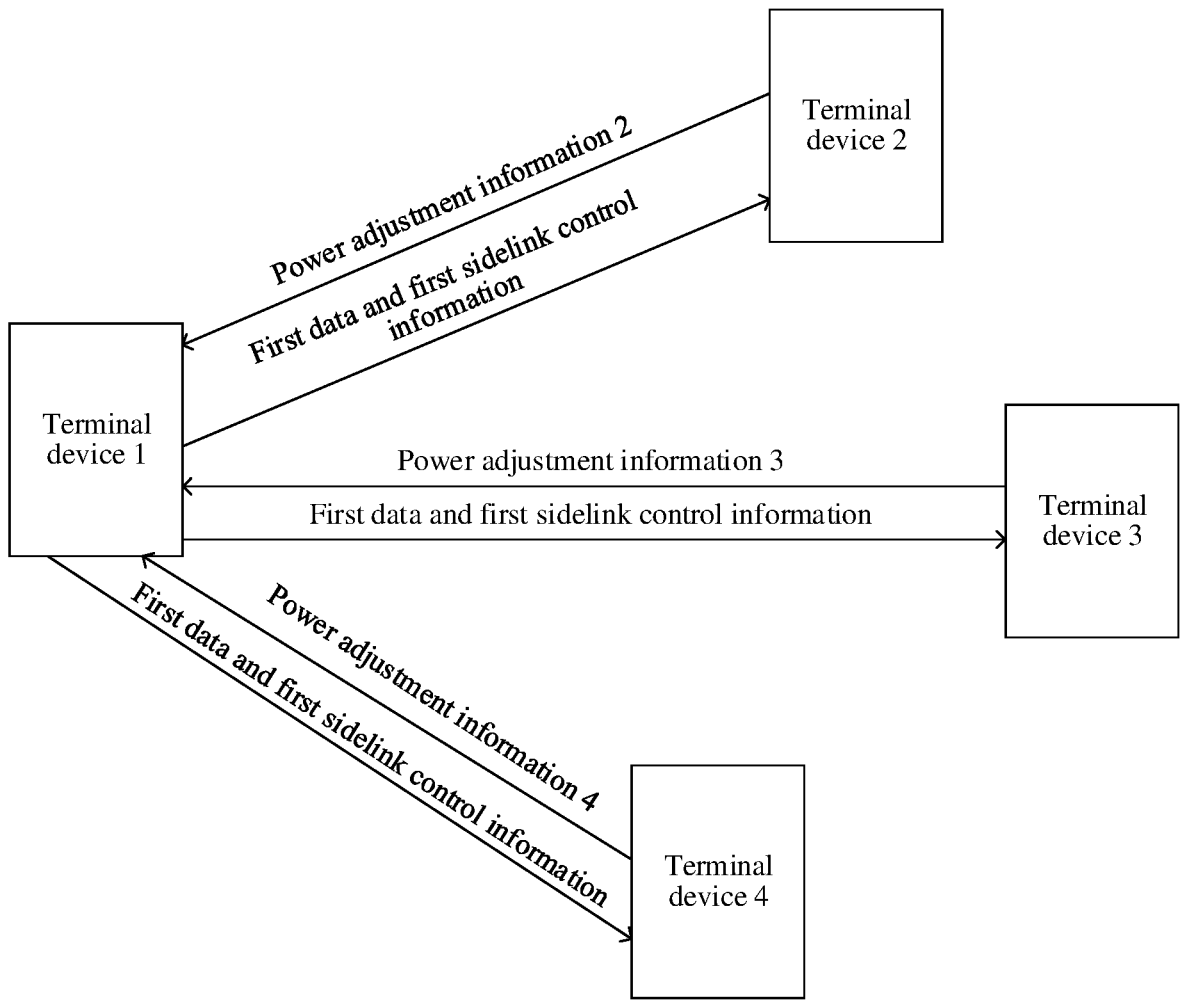
FIG. 3 is a schematic diagram of a power control method according to an embodiment of this application.

Step 21: A terminal device 1 sends first data and first sidelink control information (SCI) corresponding to the first data to at least one second terminal device. An example in which the at least one second terminal device is three second terminal devices is used for description, and details are shown in FIG. 3. Certainly, the at least one second terminal device may be one, two, three, or more second terminal devices. A terminal device 2, a terminal device 3, and a terminal device 4 separately receive the first data and the first sidelink control information corresponding to the first data from the terminal device 1.

The first data sent by the terminal device 1 is determined by an application layer. For example, the first data may include speed information, location information, and direction information of the terminal device 1. The first sidelink control information includes at least time-frequency resource indication information for sending the first data and a modulation and coding format of the first data.

Step 22: The terminal device 2, the terminal device 3, and the terminal device 4 respectively determine power adjustment information based on at least one of the first data and the first sidelink control information.

Specifically, the terminal device 2 may determine power adjustment information 2 based on the first data or the first sidelink control information, or the terminal device 2 may determine power adjustment information 2 based on the first data and the first sidelink control information. The terminal device 3 may determine power adjustment information 3 based on the first data or the first sidelink control information, or the terminal device 3 may determine power adjustment information 3 based on the first data and the first sidelink control information. The terminal device 4 may determine power adjustment information 4 based on the first data or the first sidelink control information, or the terminal device 4 may determine power adjustment information 4 based on the first data and the first sidelink control information. Alternatively, the terminal device 2 may determine power adjustment information 2 based on a plurality of pieces of data and/or a plurality of pieces of sidelink control information received from the terminal device 1, or the terminal device may determine power adjustment information 2 based on a plurality of pieces of data and/or a plurality of pieces of sidelink control information that are received from the terminal device 1 within a period of time. Manners of determining the power adjustment information 3 and the power adjustment information 4 by the terminal device 3 and the terminal device 4 are similar to the manner of determining the power adjustment information 2 by the terminal device 2, and details are not described again.

The terminal device 2 is used as an example to describe how a terminal device determines power adjustment information. The terminal device 2 may determine the power adjustment information 2 based on at least one of reference signal received power RSRP measurement, reference signal received quality RSRQ measurement, and received signal strength indicator RSSI measurement on at least one of the first data and the first sidelink control information. In a possible implementation, when a measurement result is higher than or higher than or equal to a first threshold, the terminal device 2 determines that the power adjustment information 2 is used to instruct to decrease a power; or when a measurement result is lower than or lower than or equal to a second threshold, the terminal device 2 determines that the power adjustment information 2 is used to instruct to increase a power; or when a measurement result is another condition, for example, between a first threshold and a second threshold, a power is maintained. Certainly, the first threshold and the second threshold may be the same. The first threshold and the second threshold may be configured by an access network device and sent to the terminal device 1, or may be preconfigured, or may be specified in a protocol or a standard. The first threshold or the second threshold may be related to a distance between the terminal devices. For example, when distances between the terminal devices are different, different thresholds may be used. Specifically, the terminal device 2 may determine a distance between the terminal device 2 and the terminal device 1 based on geographical location information included in the data sent by the terminal device 1, and when the distance is within a first distance range, the terminal device 2 compares the measurement with a first threshold or a second threshold corresponding to the first distance range; or when the distance is within a second distance range, the terminal device 2 compares the measurement with a first threshold or a second threshold corresponding to the second distance range.

The power adjustment information is used to instruct to perform at least one operation of increasing, decreasing, or maintaining the power. The power may be increased or decreased by a fixed value, for example, X db, each time. If X>0, for example, X=1, when the terminal device 2 determines that the power needs to be increased, the power adjustment information is used to instruct to increase the power by 1 db; or when the terminal device 2 determines that the power needs to be decreased, the power adjustment information is used to instruct to decrease the power by 1 db; or the power adjustment information is used to instruct to maintain the power. A specific value of X may also be determined by a result of comparison between the measurement result and the threshold. If the power adjustment information is used to instruct to perform only an operation of increasing, decreasing, or maintaining the power, the power adjustment information may be indicated by using two bits. The power adjustment information may further indicate an increased power value or a decreased power value when instructing to increase or decrease the power. In this case, the power adjustment information may be indicated by using more bits.

The terminal device 2 may alternatively determine the power adjustment information 2 based on power indication information included in the first data or included in the first sidelink control information. The power indication information is used to indicate a transmit power for at least one of the first data and the first sidelink control information. The terminal device 2 may determine the power adjustment information 2 based on the transmit power for at least one of the first data and the first sidelink control information. Specifically, the terminal device 2 may determine a power headroom of the terminal device 1 based on power control information, to determine the power adjustment information 2. For example, the terminal device 2 always selects, as the power adjustment information, a smaller one of the power adjustment information and the power headroom that are determined based on the measurement. Optionally, the power indication information herein may alternatively be used to indicate a power headroom for at least one of the first data and the first sidelink control information.

Step 23: The terminal device 2 sends the power adjustment information 2 to the terminal device 1, the terminal device 3 sends the power adjustment information 3 to the terminal device 1, and the terminal device 4 sends the power adjustment information 4 to the terminal device 1; and the terminal device 1 receives the power adjustment information 2 from the terminal device 2, the terminal device 1 receives the power adjustment information 3 from the terminal device 3, and the terminal device 1 receives the power adjustment information 4 from the terminal device 4. The power adjustment information respectively sent by the terminal devices 2 to 4 to the terminal device 1 may be included in physical layer signaling such as SCI, or may be sent through another physical channel such as a physical feedback channel, or may be included in higher layer signaling such as a media access control control element (MAC Control Element, MAC CE). The following uses the terminal device 2 as an example for description. If the power adjustment information is included in the SCI, a single piece of SCI may be sent by the terminal device 2 to the terminal device 1 without corresponding data transmission, or when the terminal device 2 sends data to the terminal device 1, the power adjustment information may be included in SCI corresponding to the data.

The terminal device 2 may further indicate power adjustment information of a plurality of other terminal devices in the SCI or the MAC CE. For example, the terminal device 2 receives the first data and the first sidelink control information from the terminal device 1, and the terminal device 2 further receives third data and third control information from the terminal device 3; and then the terminal device 2 determines power adjustment information 21 based on at least one of the first data and the first sidelink control information, and the terminal device 2 further determines power adjustment information 22 based on at least one of the third data and the third sidelink control information. In this case, the terminal device 2 adds the power adjustment information 21 and the power adjustment information 22 to the SCI or the MAC CE. Specifically, for example, four bits in the SCI or the MAC CE may be used to indicate the power adjustment information 21 and the power adjustment information 22. The terminal device 2 may determine, in descending order of sequence numbers of the other terminal devices (certainly, or in another order), that the first two bits of the four bits are used to indicate the power adjustment information 22 of the terminal device 3, and the last two bits are used to indicate the power adjustment information 21 of the terminal device 1. The MAC CE may include a plurality of bits to indicate IDs (for example, intra-group IDs or UE IDs) of the plurality of other terminal devices and the power adjustment information corresponding to the plurality of other terminal devices. For unicast communication, because the terminal device 2 needs to send power adjustment information to only the terminal device 1, an order of the terminal device 1 does not need to be considered. When power adjustment information is transmitted by using SCI in both unicast communication and multicast communication, a sufficient quantity of bits need to be reserved in the SCI for transmitting the power adjustment information. For example, if to bits are reserved for transmitting power adjustment information, power adjustment information of five other terminal devices in multicast communication can be transmitted; however, only two of the to bits are used to transmit power adjustment information in unicast communication. When power adjustment information is transmitted by using SCI in both unicast communication and multicast communication, the power adjustment information in unicast communication and the power adjustment information in multicast communication may alternatively be distinguished by using different resources. For example, SCI in unicast communication and SCI in multicast communication are respectively transmitted on a unicast resource and a multicast resource, so that a terminal device on a receive side can distinguish between the unicast SCI and the multicast SCI by using the resources. In this case, the unicast SCI and the multicast SCI may be in different formats, for example, have different lengths. Optionally, in a unicast communication scenario, power adjustment information is transmitted by using SCI, and in a multicast communication scenario, power adjustment information is transmitted by using a MAC CE. For example, two bits in the SCI are used to instruct to perform an operation of increasing, decreasing, or maintaining a power, and a remaining value is used to indicate a case in which a plurality of pieces of power adjustment information are transmitted on a MAC layer.

Step 24. The terminal device 1 determines a transmit power for second data based on the power adjustment information 2, the power adjustment information 3, and the power adjustment information 4. The second data is data to be sent by the terminal device 1 to the terminal devices 2 to 4. Similar to the first data, the second data may be determined by the application layer. For example, the second data includes the speed information, the location information, and the direction information of the terminal device 1.

There are a plurality of manners of determining, by the terminal device 1, the transmit power for the second data based on the power adjustment information 2, the power adjustment information 3, and the power adjustment information 4. For example, the terminal device 1 may determine a first power adjustment value based on at least one of a maximum value, a minimum value, an average value, a median value, a mode value, a quartile value, a geometric average value, and a harmonic average value of the power adjustment information 2, the power adjustment information 3, and the power adjustment information 4, and then the terminal device 1 determines the transmit power for the second data based on the first power adjustment value. For example, the power adjustment information 2 is used to instruct to increase a transmit power of the terminal device 1 by 3 db, the power adjustment information 3 is used to instruct to decrease the transmit power of the terminal device by 1 db, and the terminal device 1 determines a power adjustment value based on the power adjustment information 2 and the power adjustment information 3. Specifically, a maximum value, for example, max{3 db, −1 db}=3 db may be used; or a minimum value, min{3 db, −1 db}=−1 db may be used; or an average value, for example, mean{3 db, −1 db}=1 db may be used.

The transmit power for the second data may be expressed by using the following formula. For example, the transmit power for the second data satisfies the following formula:

$$P_{PSSCH} = \min\{P_{CMAX,PSSCH}, 10\log_{10}(M_{PSSCH}) + P_{O\_PSSCH} + \alpha_{PSSCH} \cdot PL + \delta_{PSSCH}\}, \text{ or}$$

$$P_{PSSC} = \min\{P_{CMAX,PSSCH}, 10\log_{10}(M_{PSSCH}) + P_{O\_PSSCH} + \alpha_{PSSCH} \cdot PL + f(i)\}, \text{ where}$$

$f(i) = f(i-1) + \delta_{PSSCH}$, $P_{PSSCH}$ is the transmit power for the second data, $P_{CMAX,PSSCH}$ is a maximum transmit power of the first terminal device, $M_{PSSCH}$ is a quantity of physical resource blocks occupied by the first terminal device to send the second data, PL is a path loss estimated by the first terminal device, $P_{O\_PSSCH}$ and $\alpha_{PSSCH}$ are higher layer parameters, $\delta_{PSSCH}$ is the first power adjustment value, and an initial value of f(i) is 0 or a preset value. The foregoing formulas are merely examples, and the transmit power for the second data may alternatively satisfy another formula.

PL may be estimated by the terminal device 1 based on a downlink signal, and is not an actual path loss of a sidelink. In unicast communication and multicast communication, the terminal device 1 and the terminal device 2 are used as an example for description. To enable the terminal device 1 to more precisely estimate a path loss between the terminal device 1 and the terminal device 2, the terminal device 2 may send a path loss-related parameter to the terminal device 1, to assist the terminal device 1 in more precise path loss estimation and power adjustment. In a possible manner, the path loss-related parameter is an actual transmit power of the terminal device 2. In another possible manner, the path loss-related parameter is a path loss that is between the terminal device 2 and the terminal device 1 and that is estimated by the terminal device 2. Specifically, the terminal device 1 sends, to the terminal device 2, an actual transmit power at which the terminal device 1 sends data, and the actual transmit power may be sent in SCI or a MAC CE. In this case, the terminal device 2 may estimate the path loss between the terminal device 1 and the terminal device 2 based on the actual transmit power, and then send the path loss to the terminal device 1, to assist the UE 1 in path loss estimation and power adjustment.

Particularly, in multicast communication, the terminal device 1 may obtain a plurality of path loss estimated values between the terminal device 1 and other terminal devices. For example, the terminal device 1 obtains a path loss value between the terminal device 1 and the terminal device 2, and a path loss value between the terminal device 1 and the terminal device 3. These path loss values may be estimated by the terminal device 1, or may be sent by the terminal device 2 or the terminal device 3 to the terminal device 1. The terminal device 1 needs to combine the plurality of path loss values into one path loss value for subsequent adjustment on multicast data transmit power. A specific determining manner is that a maximum value, a minimum value, an average value, or a weighted average value of the plurality of path loss values may be used. Alternatively, a specific determining manner may be another manner. For example, a median, a mode, a quartile, a geometric average, or a harmonic average of the plurality of path loss values is used.

The terminal device 1 further sends SCI when sending the second data. The SCI is used to indicate information such as a time-frequency resource and a modulation and coding format for sending the second data. The method for determining the transmit power for the second data in step 24 may also be used to determine a transmit power for the SCI. In a possible manner, if same power adjustment information is used for the SCI and the data, the terminal device 2 and the terminal device 3 need to send only one piece of power adjustment information for the SCI or the data. In another possible manner, different power adjustment information is used for the SCI and the data, and the power adjustment information for one of the SCI and the data may be determined based on the power adjustment information for the other of the SCI and the data. For example, the power adjustment information for the SCI may be determined based on the power adjustment information for the data. In this case, the terminal device 2 and the terminal device 3 need to send only one piece of power adjustment information for the SCI or the data. In still another possible manner, different power adjustment information is used for the SCI and the data, and the terminal device 2 and the terminal device 3 need to respectively send the power adjustment information for the SCI and the data.

In a unicast communication scenario, assuming that the terminal device 1 receives, in a subframe n, the power adjustment information 2 sent by the terminal device 2, the power adjustment information is valid within a time range [n+T1, n+T2], where T2≥T1≥1, and T1 and T2 are integers. Herein, T1 and T2 may be specified and fixed values, or may be configured by the access network device, or may be preconfigured, or may be selected by the terminal device 1 within a possible value range. If the terminal device 1 further needs to send unicast data to the terminal device 2 within the time range, the terminal device 1 adjusts a transmit power for the new data based on the power adjustment information.

In the multicast communication scenario, it is assumed that the terminal device 1 receives the power adjustment information sent by the terminal device 2 and the power adjustment information sent by the terminal device 3, but the two pieces of information may not be sent at a same moment. For example, the terminal device 1 receives, in a subframe n1, the power adjustment information sent by the UE 2, and receives, in a subframe n2, the power adjustment information sent by the terminal device 3. The two pieces of power adjustment information respectively correspond to effective time ranges [n1+T1, n1+T2] and [n2+T1', n2+T2'], where T1, T2, T1', and T2' may be a same value or may be different values. When the terminal device 1 further needs to send multicast data to the terminal device 2 and the terminal device 3 in a subframe m, corresponding power adjustment information is valid only when the subframe m is in the effective time range. For example, if the subframe m is within the two effective time ranges, both the two pieces of power adjustment information sent by the terminal device 2 and the terminal device 3 are valid. For example, when the subframe m is within only one of the effective time ranges, for example, the subframe m is merely within [n2+T1', n2+T2'], only the power adjustment information sent by the terminal device 3 is valid, and the power adjustment information sent by the terminal device 2 is invalid. If there is no valid power adjustment information in the subframe in which the terminal device 1 sends the data, the terminal device 1 may send the data at a maximum transmit power, or a transmit power is determined by removing f(i) from the formula in step 24.

Step 25: The terminal device 1 sends the second data to the terminal devices 2 to 4 at the transmit power determined in step 24.

According to this embodiment of this application, the terminal devices 2 to 4 determine the power adjustment information based on at least one of the data and the control information that are received from the terminal device 1, and send the power adjustment information to the terminal device 1; and the terminal device 1 determines, based on the power adjustment information sent by the terminal devices 2 to 4, the transmit power for the second data that is to be sent, to be specific, the terminal device 1 can adjust, based on a feedback of a receive end, a power for sending data, thereby improving flexibility and accuracy of power control.

Figure 4:
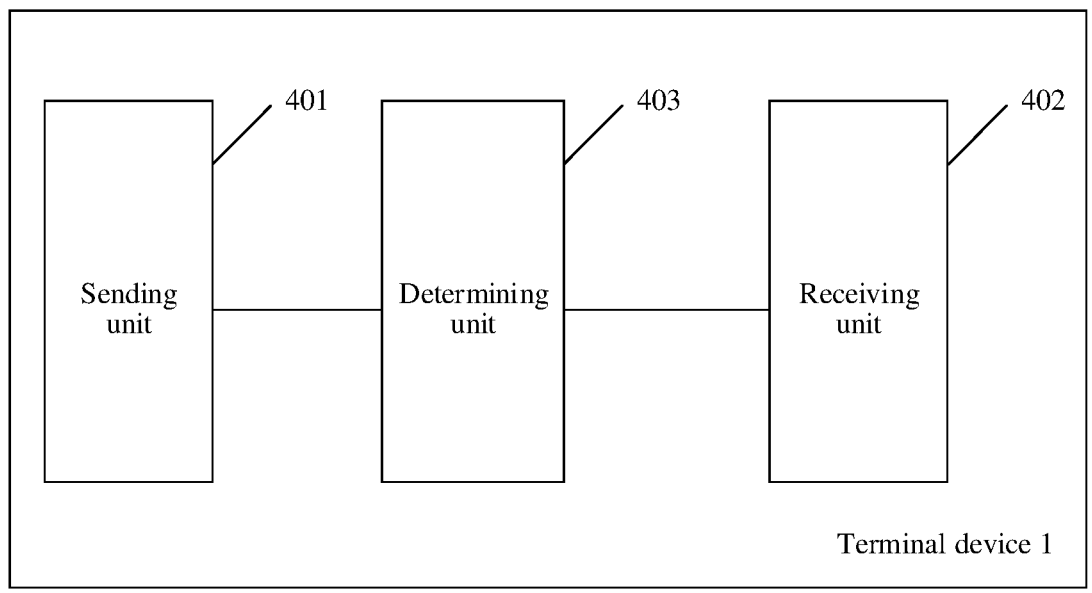
FIG. 4 shows a terminal device according to an embodiment of this application.

FIG. 4 is a possible schematic structural diagram of a terminal device 1 configured to perform the method in the embodiment in FIG. 2. The terminal device 1 includes a sending unit 401, a receiving unit 402, and a determining unit 403.

The sending unit 401 is configured to send first data and first sidelink control information corresponding to the first data to terminal devices 2 to 4. The first data and the first sidelink control information are consistent with those in the embodiment in FIG. 2, and details are not described again.

The receiving unit 402 is configured to receive power adjustment information 2 to 4 from the terminal devices 2 to 4, where the power adjustment information 2 to 4 are determined by the terminal devices 2 to 4 based on at least one of the first data and the first sidelink control information.

The determining unit 403 is configured to determine a transmit power for second data based on the power adjustment information 2 to 4. The second data and the transmit power for the second data are consistent with those in the embodiment in FIG. 2, and details are not described again. The determining unit 403 determines the transmit power for the second data based on the power adjustment information 2, the power adjustment information 3, and the power adjustment information 4 in a plurality of manners. For example, the determining unit 403 may determine a first power adjustment value based on at least one of a maximum value, a minimum value, an average value, a median value, a mode value, a quartile value, a geometric average value, and a harmonic average value of the power adjustment information 2, the power adjustment information 3, and the power adjustment information 4; and then the terminal device 1 determines the transmit power for the second data based on the first power adjustment value.

The sending unit 401 is further configured to send the second data to the terminal devices 2 to 4 at the transmit power determined by the determining unit 403.

The sending unit 401 may be a transmitter or a transceiver, the receiving unit 402 may be a receiver or a transceiver, and the determining unit 403 may be a processor. In addition, the terminal device may further include a memory, and the memory is configured to store program code and data of the terminal device.

According to this embodiment of this application, the terminal devices 2 to 4 determine the power adjustment information based on at least one of the data and the control information that are received from the terminal device 1, and send the power adjustment information to the terminal device 1; and the terminal device 1 determines, based on the power adjustment information sent by the terminal devices 2 to 4, the transmit power for the second data that is to be sent, to be specific, the terminal device 1 can adjust, based on a feedback of a receive end, a power for sending data, thereby improving flexibility and accuracy of power control.

Figure 5:
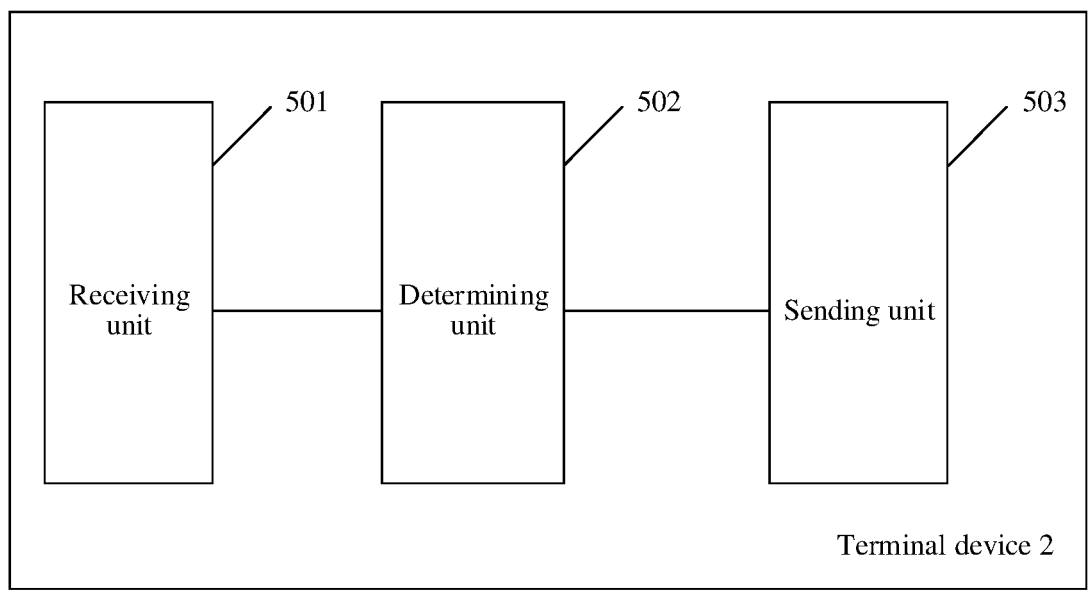
FIG. 5 shows another terminal device according to an embodiment of this application.

FIG. 5 is a possible schematic structural diagram of a terminal device 2 configured to perform the method in the embodiment in FIG. 2. The terminal device 2 includes a receiving unit 501, a determining unit 502, and a sending unit 503. Certainly, each of a terminal device 3 and a terminal device 4 have a same structure as the terminal device 2, and details are not described again.

The receiving unit 501 is configured to receive first data and first sidelink control information corresponding to the first data from a terminal device 1. The first data and the first sidelink control information are consistent with those in the embodiment in FIG. 2, and details are not described again.

The determining unit 502 is configured to determine power adjustment information based on at least one of the first data and the first sidelink control information.

Specifically, the determining unit 502 may determine power adjustment information 2 based on the first data or the first sidelink control information, or the determining unit 502 may determine power adjustment information 2 based on the first data and the first sidelink control information.

The determining unit 502 may determine the power adjustment information 2 based on at least one of reference signal received power (RSRP) measurement, reference signal received quality (RSRQ) measurement, and received signal strength indicator (RSSI) measurement on at least one of the first data and the first sidelink control information. When a measurement result is higher than a first threshold, the determining unit 502 determines that the power adjustment information 2 is used to instruct to decrease a power; when a measurement result is lower than a second threshold, the determining unit 502 determines that the power adjustment information 2 is used to instruct to increase a power; or when a measurement result is between a first threshold and a second threshold, a power is maintained. The first threshold and the second threshold may be configured by an access network device and sent to the terminal device 1, or may be preconfigured in a protocol or a standard.

The determining unit 502 may alternatively determine the power adjustment information 2 based on power indication information included in the first data or included in the first sidelink control information, where the power indication information is used to indicate a transmit power for at least one of the first data and the first sidelink control information. The determining unit 502 may determine the power adjustment information 2 based on the transmit power for at least one of the first data and the first sidelink control information.

The sending unit 503 is configured to send the power adjustment information to the first terminal device, where the power adjustment information is used by the first terminal device to determine a transmit power for second data. The second data and the transmit power for the second data and are consistent with those in the embodiment in FIG. 2, and details are not described again.

The receiving unit 501 may be a receiver or a transceiver, the determining unit 502 may be a processor, and the sending unit 503 may be a transmitter or a transceiver. In addition, the terminal device may further include a memory, and the memory is configured to store program code and data of the terminal device.

According to this embodiment of this application, the terminal devices 2 to 4 determine the power adjustment information based on at least one of the data and the control information that are received from the terminal device 1, and send the power adjustment information to the terminal device 1; and the terminal device 1 determines, based on the power adjustment information sent by the terminal devices 2 to 4, the transmit power for the second data that is to be sent, to be specific, the terminal device 1 can adjust, based on a feedback of a receive end, a power for sending data, thereby improving flexibility and accuracy of power control.

In the several embodiments provided in this application, it should be understood that the disclosed system, apparatus, and method may be implemented in other manners. For example, the foregoing described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A method, comprising:
    sending, by a first terminal device, first data and first sidelink control information corresponding to the first data to a second terminal device, wherein the first sidelink control information comprises at least time-frequency resource indication information for sending the first data and further comprises a modulation and coding format of the first data;
    receiving, by the first terminal device, at least one piece of power adjustment information from the second terminal device, wherein the at least one piece of power adjustment information is determined by the second terminal device based on the first data or the first sidelink control information;
    determining, by the first terminal device, a transmit power for second data based on the at least one piece of power adjustment information; and
    sending, by the first terminal device, the second data to the second terminal device at the transmit power.

2. The method according to claim 1, wherein determining, by the first terminal device, the transmit power for the second data based on the at least one piece of power adjustment information comprises:
    determining, by the first terminal device, a first power adjustment value based on a maximum value, a minimum value, an average value, a median value, a mode value, a quartile value, a geometric average value, or a harmonic average value of the at least one piece of power adjustment information; and
    determining, by the first terminal device, the transmit power for the second data based on the first power adjustment value.

3. The method according to claim 1, wherein the at least one piece of power adjustment information being determined by the second terminal device based on the first data or the first sidelink control information comprises:
    the at least one piece of power adjustment information being determined by the second terminal device based on measurement of the first data or the first sidelink control information, wherein the measurement comprises reference signal received power measurement, reference signal received quality measurement, or received signal strength indicator measurement.

4. The method according to claim 1, wherein the at least one piece of power adjustment information being determined by the second terminal device based the first data or the first sidelink control information comprises:
    the at least one piece of power adjustment information being determined based on power indication information sent by the first terminal device, wherein the power indication information is comprised in the first data or comprised in the first sidelink control information, and the power indication information indicates a transmit power for the first data or the first sidelink control information.

5. The method according to claim 1, wherein the at least one piece of power adjustment information instructs to increase, decrease, or maintain a power.

6. A first terminal device, comprising:
    a transmitter;
    a receiver;
    a processor; and
    a non-transitory computer-readable storage medium storing a program to be executed by the processor, the program including instructions to:
        send, using the transmitter, first data and first sidelink control information corresponding to the first data to a second terminal device, wherein the first sidelink control information comprises at least time-frequency resource indication information for sending the first data and further comprises a modulation and coding format of the first data;
        receive, through the receiver, at least one piece of power adjustment information from the second terminal device, wherein the at least one piece of power adjustment information is determined by the second terminal device based on the first data or the first sidelink control information, and a distance between the first terminal device and the second terminal device determined according to geographical location information included in the first data; and determine a transmit power for second data based on the at least one piece of power adjustment information;

wherein the transmitter is further configured to send the second data to the second terminal device at the transmit power.

7. The first terminal device according to claim 6, wherein the instructions to determine the transmit power for the second data based on the at least one piece of power adjustment information comprise instructions to:

determine a first power adjustment value based on a maximum value, a minimum value, an average value, a median value, a mode value, a quartile value, a geometric average value, or a harmonic average value of the at least one piece of power adjustment information; and determine the transmit power for the second data based on the first power adjustment value.

8. The first terminal device according to claim 6, wherein the at least one piece of power adjustment information being determined by the second terminal device based on the first data or the first sidelink control information comprises:

the at least one piece of power adjustment information being determined by the second terminal device based on measurement of the first data or the first sidelink control information, wherein the measurement comprises reference signal received power measurement, reference signal received quality measurement, or received signal strength indicator measurement.

9. The first terminal device according to claim 6, wherein the at least one piece of power adjustment information being determined by the second terminal device based on the first data or the first sidelink control information comprises:

the at least one piece of power adjustment information being determined based on power indication information, wherein the power indication information is comprised in the first data or comprised in the first sidelink control information, and the power indication information indicates a transmit power for the first data or the first sidelink control information.

10. The first terminal device according to claim 6, wherein the at least one piece of power adjustment information instructs to increase, decrease, or maintain power.

11. The first terminal device according to claim 6, wherein the at least one piece of power adjustment information is determined by the second terminal device based on the first data and the first sidelink control information.

12. The first terminal device according to claim 6, wherein the at least one piece of power adjustment information is determined by the second terminal device based on the first data.

13. The first terminal device according to claim 6, wherein the at least one piece of power adjustment information is determined by the second terminal device based on the first sidelink control information.

14. A method, comprising:

receiving, by a second terminal device, first data and first sidelink control information corresponding to the first data from a first terminal device;

determining, by the second terminal device, power adjustment information based on the first data or the first sidelink control information, and a distance between the first terminal device and the second terminal device determined according to geographical location information included in the first data; and sending, by the second terminal device, the power adjustment information to the first terminal device, wherein the power adjustment information is used by the first terminal device to determine a transmit power for second data.

15. The method according to claim 14, wherein determining, by the second terminal device, the power adjustment information based on the first data or the first sidelink control information comprises:

determining, by the second terminal device, the power adjustment information based on measurement of the first data or the first sidelink control information, wherein the measurement comprises reference signal received power measurement, reference signal received quality measurement, or received signal strength indicator measurement.

16. The method according to claim 14, wherein determining, by the second terminal device, the power adjustment information based on the first data and the first sidelink control information comprises:

determining, by the second terminal device, the power adjustment information based on power indication information received from the first terminal device, wherein the power indication information is comprised in the first data or comprised in the first sidelink control information, and the power indication information indicates a transmit power for the first data or the first sidelink control information.

17. The method according to claim 14, wherein the power adjustment information instructs to increase, decrease, or maintain power.

18. The method according to claim 14, wherein determining, by the second terminal device, the power adjustment information based on the first data or the first sidelink control information comprises:

determining, by the second terminal device, power adjustment information based on the first data.

19. The method according to claim 14, wherein determining, by the second terminal device, the power adjustment information based on the first data or the first sidelink control information comprises:

determining, by the second terminal device, power adjustment information based on the first sidelink control information.

20. The method according to claim 14, wherein determining, by the second terminal device, the power adjustment information based on the first data or the first sidelink control information comprises:

determining, by the second terminal device, power adjustment information based on the first data and the first sidelink control information.

* * * * *